(12) United States Patent
Behne (10) Patent No.: US 7,311,029 B2
(45) Date of Patent: Dec. 25, 2007

(54) QUICK-PIN BLADE TENSIONING DEVICE

(75) Inventor: Rockne W. Behne, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 24 days.

(21) Appl. No.: 10/621,921

(22) Filed: Jul. 17, 2003

(65) Prior Publication Data

US 2004/0025660 A1 Feb. 12, 2004

Related U.S. Application Data (60) Provisional application No. 60/402,251, filed on Aug. 9, 2002.

(51) Int. Cl.
*B23D 55/10* (2006.01)
*B26D 1/48* (2006.01)
*B27B 13/08* (2006.01)

(52) U.S. Cl. .......................................... 83/816; 83/814

(58) Field of Classification Search ................. 83/814, 83/816–819, 788, 808, 809; 30/380, 513; 474/101, 112, 113, 117, 136
See application file for complete search history.

(56) References Cited

U.S. PATENT DOCUMENTS

| | | | | |
|---|---|---|---|---|
| 170,577 A | * | 11/1875 | Margedant | 83/817 |
| 769,497 A | | 9/1904 | Seymour | 83/422 |
| 1,571,972 A | | 2/1926 | Schettler | 83/816 |
| 1,967,724 A | * | 7/1934 | Ponton | 83/817 |
| 2,081,033 A | | 5/1937 | Biro | 83/817 |
| 2,101,343 A | * | 12/1937 | Ponton | 83/818 |
| 2,364,969 A | | 12/1944 | Grob et al. | 83/412 |
| 2,627,881 A | | 2/1953 | Houtte et al. | 83/816 |
| 2,825,369 A | | 3/1958 | Karp et al. | 83/818 |
| 2,969,815 A | * | 1/1961 | Lasar | 83/818 |
| 3,465,794 A | | 9/1969 | McLauchlan et al. | 83/420 |
| 3,521,682 A | | 7/1970 | Schnizler, Jr. | 83/816 |
| 3,658,102 A | | 4/1972 | Joosten | 30/373 |

(Continued)

FOREIGN PATENT DOCUMENTS

CH 205262 9/1939

(Continued)

OTHER PUBLICATIONS

"Quick Release by Carter," Installation Instructions; 9 pages, date unknown.

(Continued)

*Primary Examiner*—Clark F. Dexter
(74) *Attorney, Agent, or Firm*—Mehul R. Jani; Adan Ayala; Charles Yocum (57) ABSTRACT

A quick-pin blade tensioning device for a band saw comprises a sliding tension bracket coupled with an upper arm of the band saw. The sliding tension bracket engages an upper band wheel which has a band saw blade coupled to it. A lifting shoe, slidably disposed within the upper arm, imparts movement to the sliding tension bracket. A pin moves the lifting shoe through rotational movement of the pin imparted by a coupling with a tension crank. The tension crank, disposed within the upper arm, has rotational movement imparted to it through a coupling with a tension handle enabled with multiple positions.

10 Claims, 7 Drawing Sheets

U.S. PATENT DOCUMENTS

| | | | |
|---|---|---|---|
| 3,829,970 A | 8/1974 | Anderson | 30/380 |
| 3,889,567 A | 6/1975 | Sato et al. | 83/818 |
| 4,311,074 A | 1/1982 | Titus | 83/816 |
| 4,321,849 A | 3/1982 | Athey et al. | 83/816 |
| 4,329,901 A | 5/1982 | Stroud | 83/819 |
| 4,356,750 A | 11/1982 | Legler et al. | 83/816 |
| 4,386,545 A | 6/1983 | Chaconas | 83/817 |
| 4,505,176 A | 3/1985 | Hamel | 83/808 |
| 4,535,666 A | 8/1985 | Fiori et al. | 83/795 |
| 4,576,077 A | 3/1986 | Titus | 83/816 |
| 4,640,171 A | 2/1987 | Jansson | 83/797 |
| 4,920,650 A | 5/1990 | Edlund | 30/386 |
| 4,926,733 A | 5/1990 | Janson | 83/819 |
| 4,960,026 A | 10/1990 | Terpstra | 83/818 |
| 5,070,618 A | 12/1991 | Edlund | 30/386 |
| 5,109,744 A | 5/1992 | Syre et al. | 83/818 |
| 5,176,055 A | 1/1993 | Wijesinghe et al. | 83/72 |
| D336,653 S | 6/1993 | Baird et al. | D15/134 |
| 5,237,897 A | 8/1993 | Wijesinghe et al. | 83/72 |
| 5,261,304 A | 11/1993 | Stollenwerk et al. | 83/410.8 |
| 5,305,673 A | 4/1994 | Costley | 83/802 |
| 5,345,850 A | 9/1994 | Neitzell | 83/814 |
| 5,408,910 A | 4/1995 | Ohnishi et al. | 83/820 |
| 5,557,989 A | 9/1996 | Smith, Jr. | 76/74 |
| 5,662,017 A | 9/1997 | Mellon | 83/169 |
| 5,819,630 A | 10/1998 | Smith | 83/811 |
| 5,941,153 A | 8/1999 | Chang | 83/662 |
| 6,073,531 A | 6/2000 | Chang | 83/818 |
| H1867 H | 10/2000 | Quiram | 83/781 |
| 6,557,447 B2* | 5/2003 | Lee | 83/816 |
| 6,739,231 B2* | 5/2004 | Snodgrass, Jr. | 83/816 |
| 2001/0054337 A1 | 12/2001 | Snodgrass, Jr. | 83/13 |
| 2003/0196535 A1 | 10/2003 | Chiang | 83/818 |

FOREIGN PATENT DOCUMENTS

| | | |
|---|---|---|
| DE | 22296 | 11/1961 |
| DE | 2625096 | 4/1978 |
| DE | 4104576 | 10/1991 |
| GB | 160007 | 3/1921 |

OTHER PUBLICATIONS

"Quick Release Band Saw Blade Tension Toggle," Quick Release Main Page, http://www.carterproducts.com/product/quickrel/grl.htm; Dec. 31, 2002; 2 pages.

"Faster Bandsaw Blade Changes," by Danny Proulx; CabinetMaker®, p. 152; Jun. 2001; 1 page.

"Taunton's Fine Woodworking, Tools & Materials, Release and Reset Bandsaw-Blade Tension in Seconds," by John White; Aug. 2001; No. 150; 1 page.

"Carter Quick Release™, Bandsaw Blade Tension Toggle," Carter Products Company, Inc., 2871 Northridge Drive N.W., Grand Rapids, MI 49544; sales@carterproducts.com.; 1 page, date unknown.

* cited by examiner

QUICK-PIN BLADE TENSIONING DEVICE

CROSS REFERENCE TO RELATED APPLICATION

The present application claims priority under 35 U.S.C. §119(e) to the U.S. Provisional Application Ser. No. 60/402,251, filed on Aug. 9, 2002, which is herein incorporated by reference in its entirety.

FIELD OF THE INVENTION

The present invention generally relates to the field of band saws, and particularly to an improved band saw blade tensioning device.

BACKGROUND OF THE INVENTION

Band saws employ a continuous loop blade that is coupled to a pair of pulleys or band wheels. The band wheels are typically mounted in a common plane to a frame, the mounting spaces apart the band wheels and allows the band wheels to rotate about parallel axes. Typically, one of the band wheels is coupled with a motor assembly which drives the rotation of the band wheel and therefore the blade.

Generally, one of the band wheels is enabled to be moved relative to the position of the other band wheel while maintaining the common plane and parallel axes of rotation. This movement capability allows an operator of a band saw to increase and decrease the distance between the band wheels, thereby increasing or decreasing the tension applied to the band saw blade. This is commonly referred to as tensioning the band saw blade.

It is well-known in the art that tensioning of a band saw blade may occur through use of screw-type (threaded) adjustment mechanisms or handwheel-type (rack and pinion) adjustment mechanisms. These mechanisms are often cumbersome and difficult to operate in a working environment. Unfortunately, a typical problem for both of these types of tensioning mechanisms is that their use often results in an over-tightening of the saw blade. This may result in a warping of the saw blade or even the frame to which the band wheels are mounted. Further, over-tightening may cause undue stress on the blade leading to a shorter useful working life or even blade breakage. Such problems may lead to increased costs to the operator and decreased productivity from the band saw.

Therefore, it would be desirable to provide a mechanism that may help prevent over-tightening and enable an operator to provide an amount of tensioning to a blade through an easy to operate system.

SUMMARY OF THE INVENTION

Accordingly, the present invention is directed to a quick-pin blade tensioning device for a band saw which provides an operator of a band saw a simple and effective way to apply an amount of tension to a band saw blade and also just as easily remove that amount of tension to the blade. Through use of a tensioning handle, the operator may apply tension to the blade for operation purposes. Then when the operation has been completed and the band saw is no longer in use, the operator may use the tensioning handle to remove the tension from the blade. This release of tension may help prolong the blade's working life, prevent damage to the band wheels and frame, and increase productivity from the band saw. In a first aspect of the present invention, a quick-pin blade tensioning device for a band saw including an upper band wheel operationally engaging a band saw blade, comprises a sliding tension bracket for operationally engaging with an upper arm of the band saw and the upper band wheel. Further, a lifting shoe is coupled with the sliding tension bracket and is received within the upper arm. The lifting shoe allows the sliding tension bracket to slide within the upper arm. A pin is operationally coupled with the lifting shoe and moves the lifting shoe within the upper arm. A tension crank includes a first end and a second end, the first end coupling with the pin. The tension crank is received within the upper arm and enables the movement of the pin. A tension handle having a first position and a second position is coupled with the second end of the tension crank and rotates the tension crank causing the pin to move the lifting shoe, wherein the tension handle when in the first position releases tension to the band saw blade and applies tension from the band saw blade when in the second position.

In a second aspect of the present invention, a band saw including an upper band wheel operationally engaging a band saw blade, comprises a quick-pin blade tensioning device operationally coupled with the upper band wheel. The blade tensioning device comprises a sliding tension bracket for operationally engaging with an upper arm of the band saw and the upper band wheel. Further, a lifting shoe is coupled with the sliding tension bracket and is received within the upper arm, the lifting shoe for causing the sliding tension bracket to slide within the upper arm. A pin is operationally coupled with the lifting shoe and moves the lifting shoe within the upper arm. A tension crank includes a first end and a second end, the first end coupling with the pin. The tension crank is received within the upper arm and enables the movement of the pin. A tension handle having a first position and a second position is coupled with the second end of the tension crank and rotates the tension crank causing the pin to move the lifting shoe, wherein the tension handle when in the first position releases tension from the band saw blade and applies tension to the band saw blade when in the second position.

In a third aspect of the present invention, a method for adjusting the tension of a blade operationally coupled with an upper band wheel of a band saw, comprises positioning a quick-pin blade tensioning device in operational contact with the upper band wheel and providing a tension handle for engagement by a user, followed by at least one step selected from the group consisting of: (a) rotating the tension handle to a first position whereby the tensioning assembly moves the upper band wheel in a first direction decreasing tension in the blade or (b) rotating the tension handle to a second position whereby the tensioning assembly moves the upper band wheel in a second direction increasing tension on the blade.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown. A quick-pin blade tensioning device, of the present invention, provides an amount of tension which may be applied to a saw blade of a band saw. The amount may be varied to accommodate the use of differently sized band saw blades. The quick-pin blade tensioning device is often used in conjunction with a standard tensioning device, such as a threaded shaft or rack-and-pinion device. The quick-pin blade tensioning device provides a user with an adjustment capability to complement the adjustments made using the standard tensioning device. This may prolong the useful life of the saw blade and prevent damage to the other components of the band saw.

Figure 1:
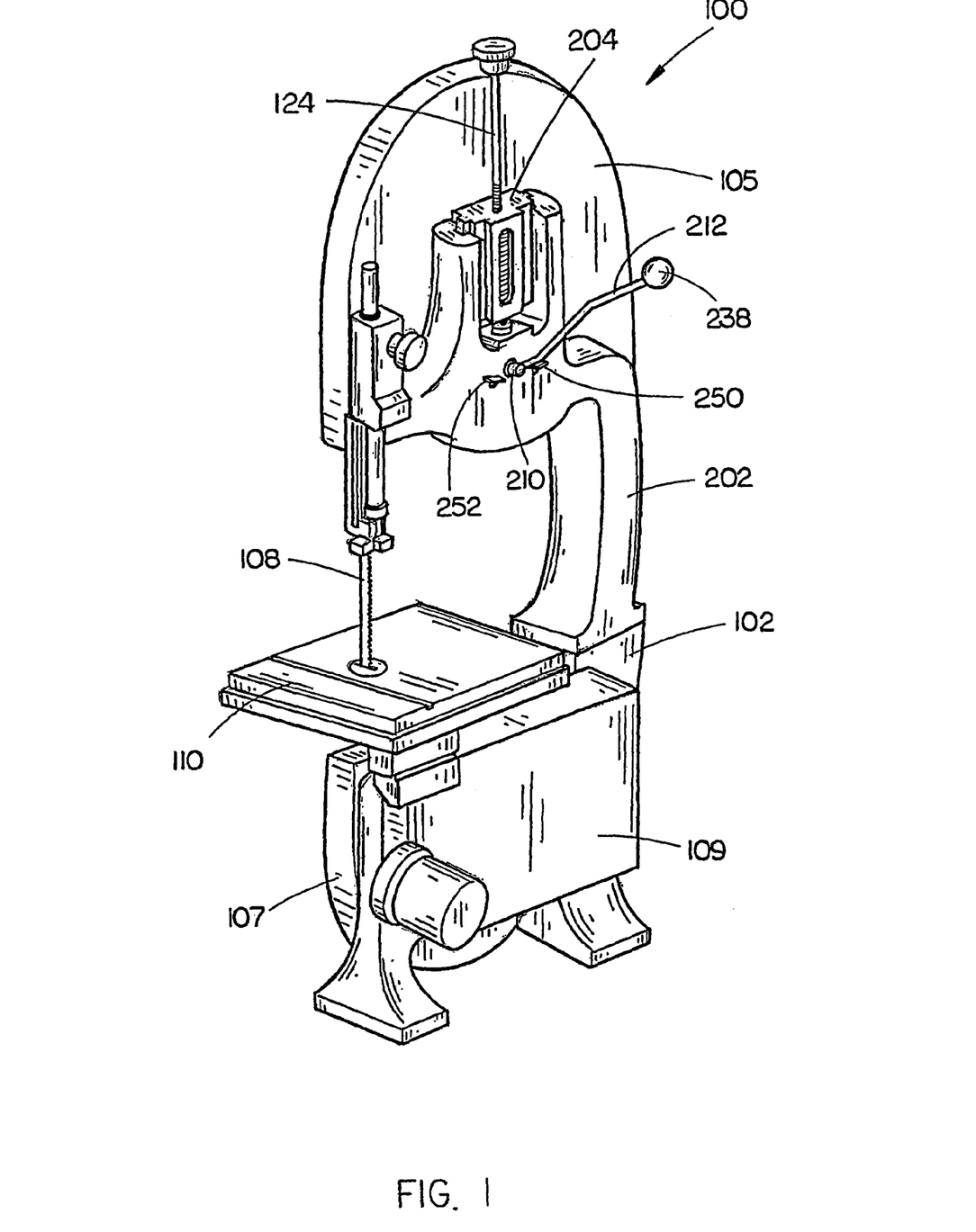
FIG. 1 is a perspective view illustrating an exemplary embodiment of a band saw including a quick-pin blade tensioning device in accordance with the present invention.

A band saw 100, shown in FIG. 1, generally comprises a frame 102 to which an upper band wheel assembly 105, including an upper band wheel 106, and a lower band wheel assembly 107, which includes a lower band wheel (not shown), are mounted. The upper and lower band wheels are mounted in a common plane but in a spaced apart configuration. The upper and lower band wheels are engaged by a continuous loop saw blade 108. The mounting of the upper and lower band wheel enables them to rotate about parallel axes providing angular momentum to the saw blade. A motor assembly 109 is coupled with the lower band wheel assembly 107 and imparts a rate of rotation to the lower band wheel which is translated to the saw blade 108. A table 110 is coupled with the frame 102 and is operationally engaged by the saw blade 108. It is understood that other configurations for a band saw as contemplated by one of ordinary skill in the art may be employed.

In the preferred embodiment, the frame 102 is comprised of an upper arm 202 (shown and described in FIGS. 2 through 6). The upper arm 202 is operationally coupled with a sliding tension bracket 204 (shown and described in FIGS. 2 through 6) which is engaged with a threaded shaft 124. The upper arm 202 is further coupled by a tension handle 212 and a first stop 250 and a second stop 252. The first and second stop 250 and 252 are used to limit the range of movement of the tension handle 212.

Figure 2:
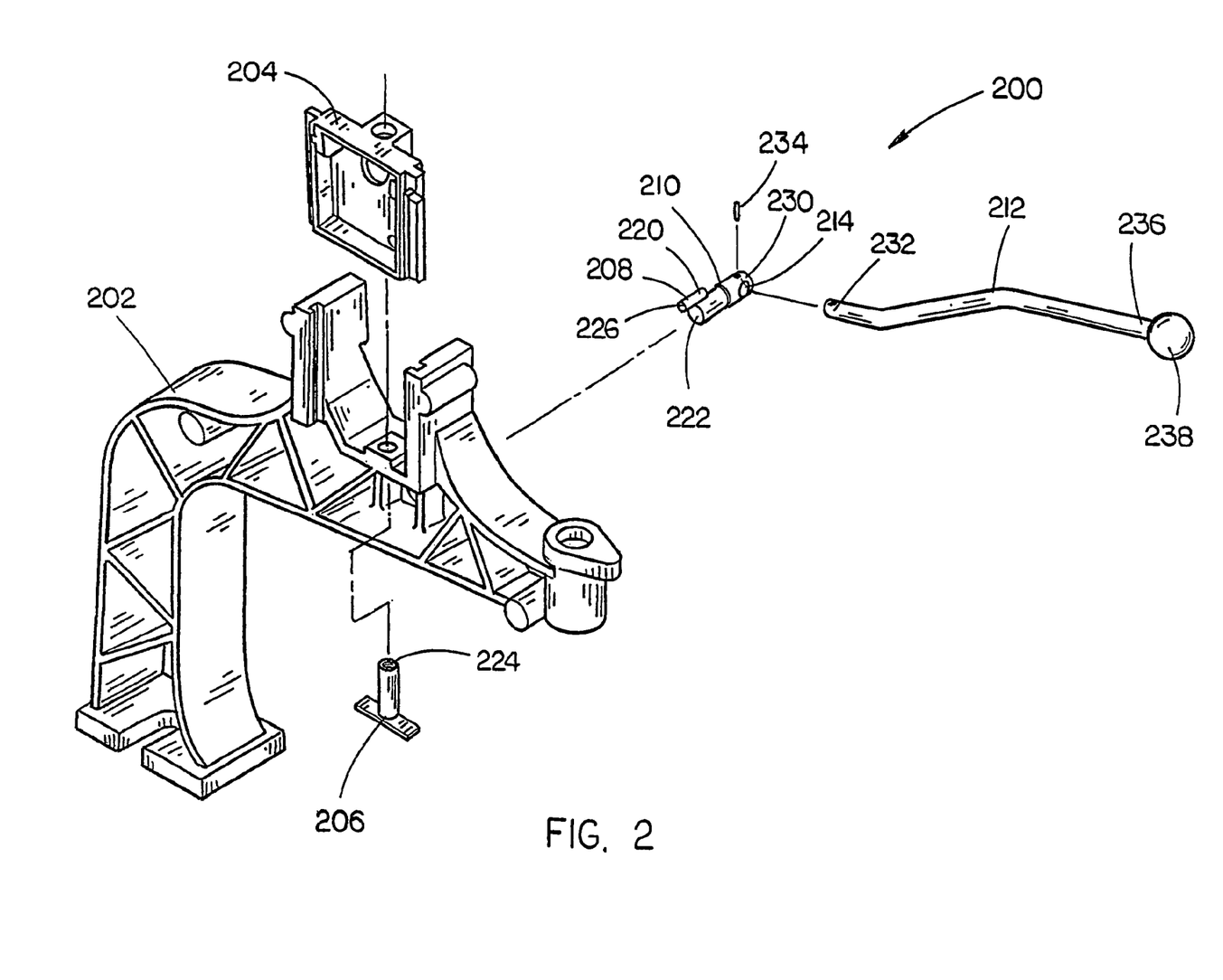
FIG. 2 is an exploded view of the quick-pin blade tensioning device of the present invention.
Figure 3:
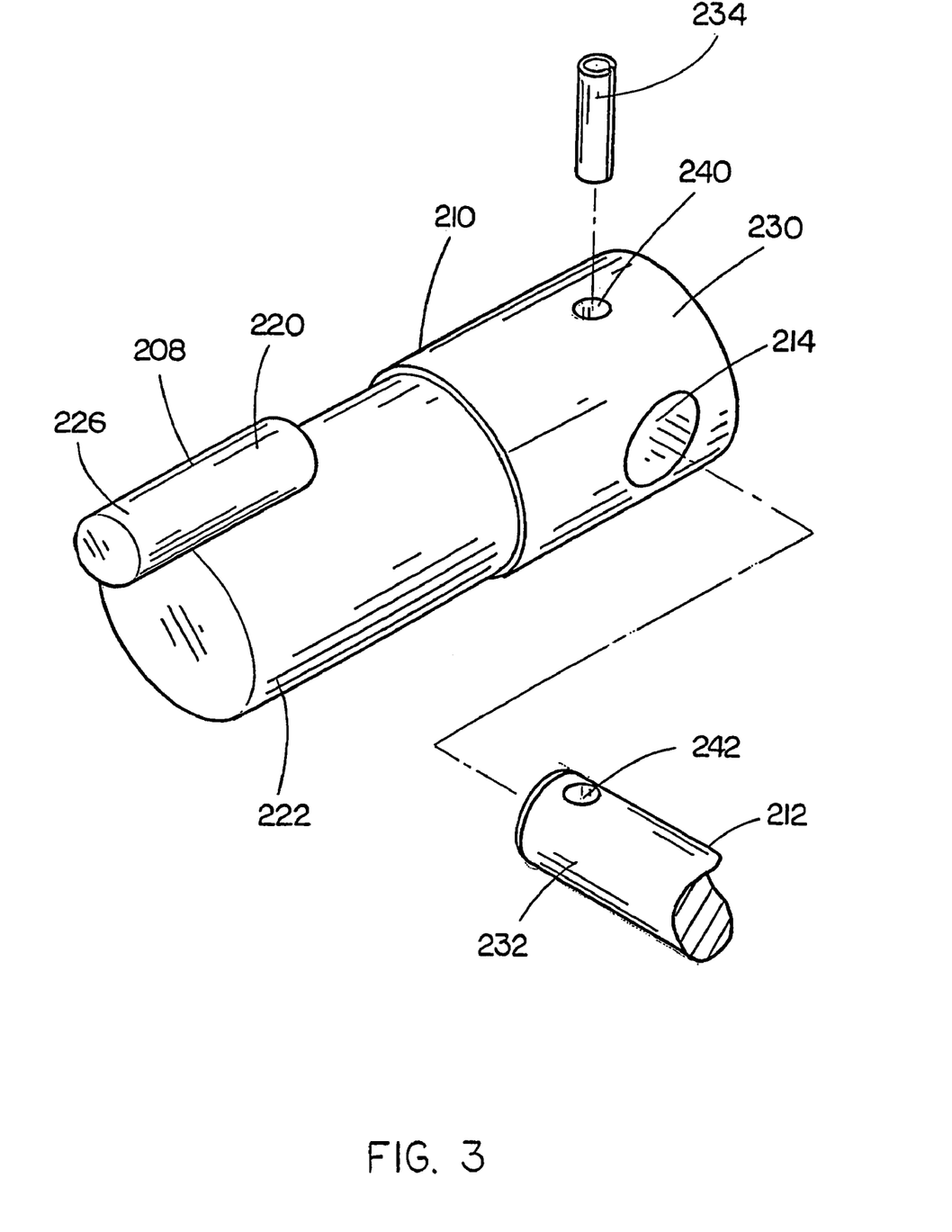
FIG. 3 is an isometric illustration of a tension crank of the present invention including a pin coupled to a first end of the tension crank.
Figure 4:
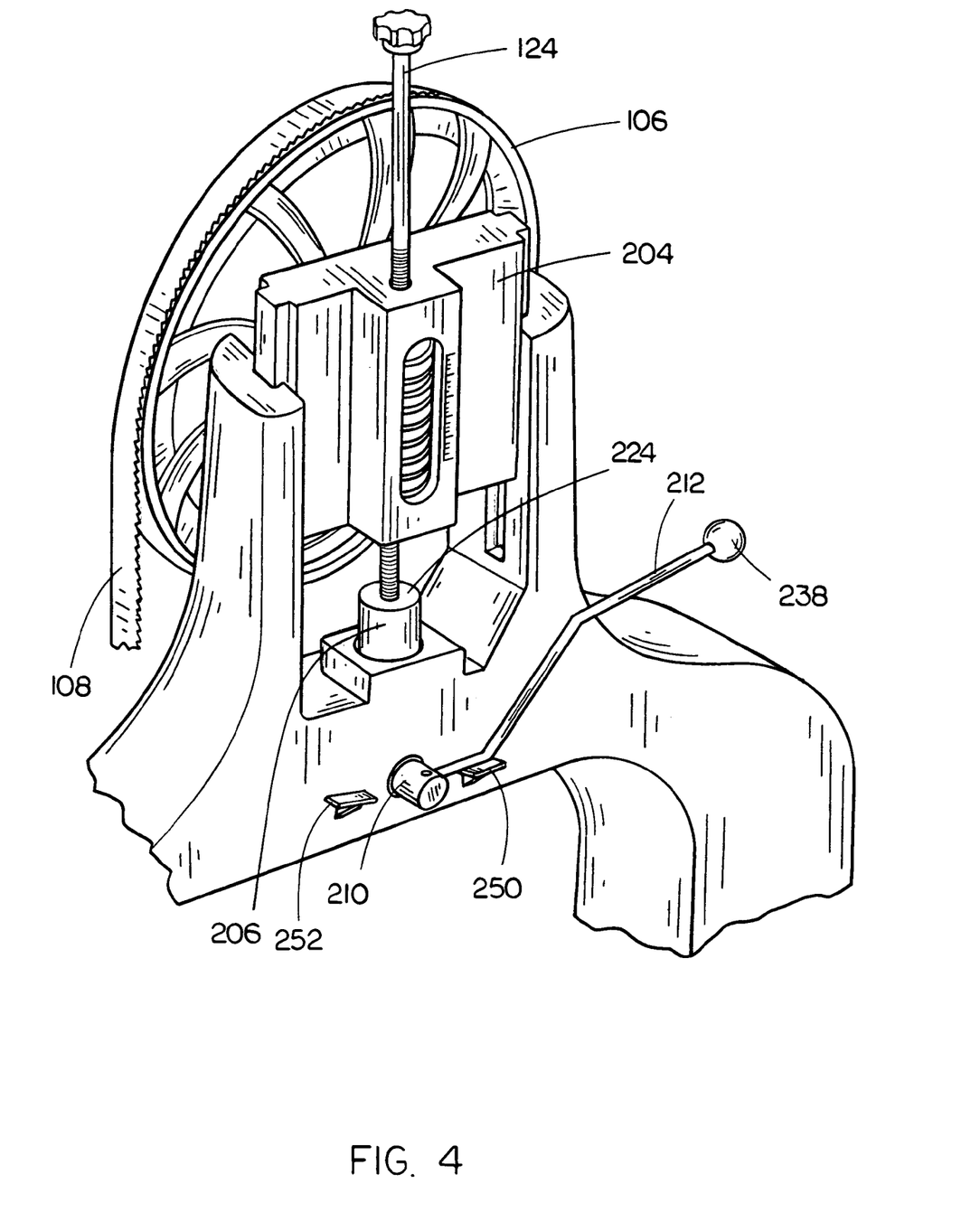
FIG. 4 is an isometric illustration of the quick-pin blade tensioning device operationally engaging a band wheel of the band saw.

A quick-pin blade tensioning device 200 is shown in FIG. 2, including an upper arm 202 operationally coupled with a sliding tension bracket 204. The upper arm 202 and the sliding tension bracket 204 are similar to those shown and described in FIG. 1. The sliding tension bracket is operationally engaged by a lifting shoe 206. The lifting shoe 206 is engaged by a pin 208 coupled with a tension crank 210. The tension crank 210 is further coupled with a tension handle 212. The tension handle 212 is engaged by a user and is enabled to be pivotally or rotatably adjusted between a first and a second position. As shown in FIGS. 1 and 4, disposed on the upper arm 202 is a first stop 250 and a second stop 252. As shown in FIG. 4, the first stop 250 engages with the tension handle 212 when the tension handle is being rotated into the first position. The first stop 250 defines the location of the first position for the tension handle 212 and provides a support to the tension handle 212. The second stop 252 engages with the tension handle 212 when the tension handle is being rotated into the second position. The second stop 252 defines the location of the second position for the tension handle 212 and provides a support to the tension handle 212. It is contemplated that the tension handle may be enabled with a plurality of achievable positions and the configuration and number of stops provided by the present invention may vary accordingly. For instance, the tension handle 212 may be enabled as a three or more position device and engage with three or more stops disposed on the upper arm 202.

Further, the stops may be provided through a stop assembly engaging with the tension crank 210 or the pin 208. In such a situation the stops may be an internal stop assembly disposed within the upper arm 202 and engaging with the tension crank 210 and/or pin 208. For instance, the stop assembly may be a compression assembly which establishes multiple stop positions of the tension crank 210 and/or pin 208. The stop positions may be overcome through manual rotation of the tension handle 212 or a release assembly may be provided. For example, a depression switch assembly may be disposed externally upon the upper arm 202 for engagement by a user of the band saw 100 when a re-positioning of the tension handle 212 is desired. It is further contemplated that the release assembly may be disposed upon the tension handle 212 or the ball knob 238 for engagement by the user. This would enable a quick release system of the positioning of the tension handle 212 and concomitantly the tensioning of the saw blade 108.

Figure 5:
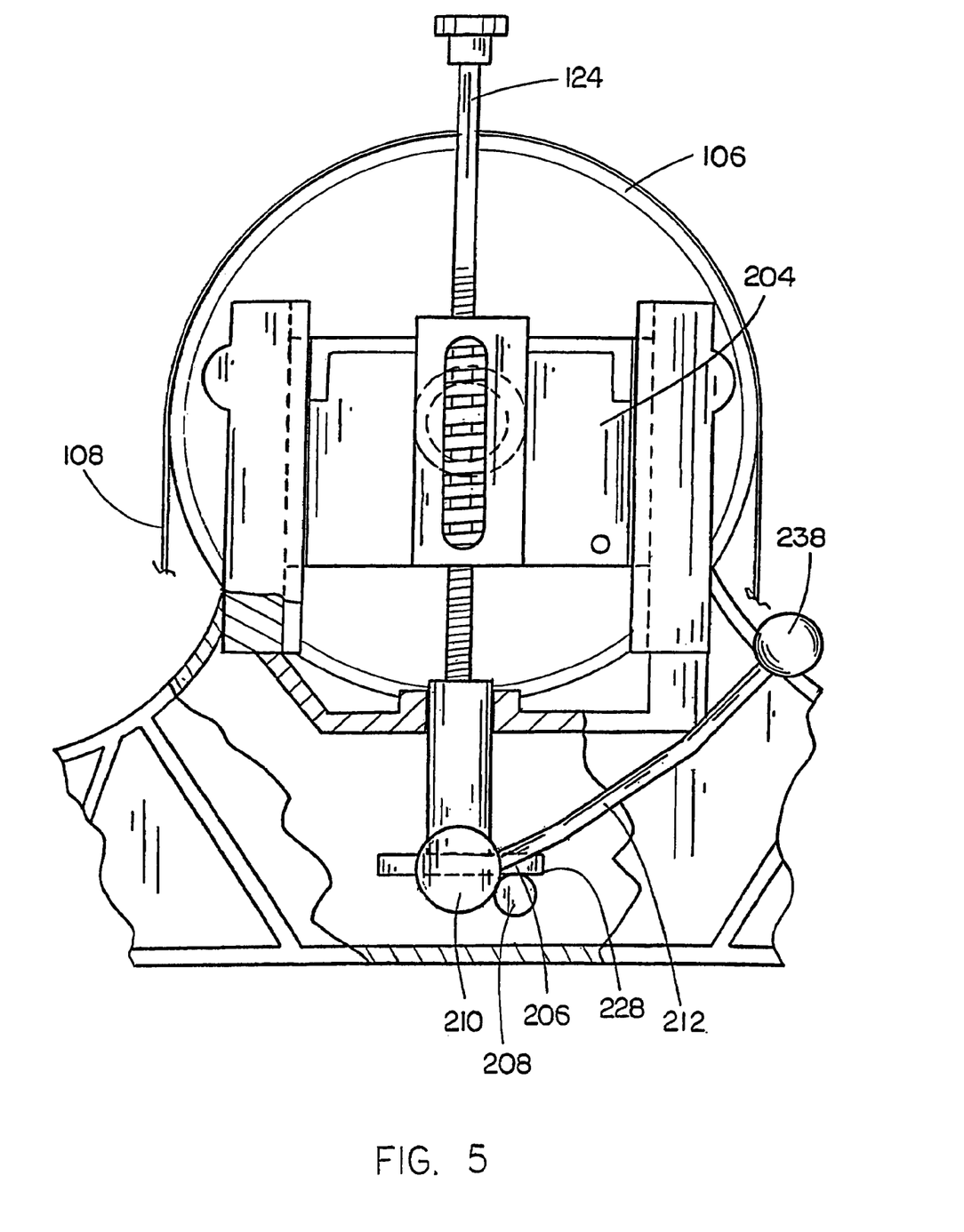
FIG. 5 is a perspective view of the tension crank including the pin, wherein the pin is operationally engaging a lifting shoe in a first position.
Figure 6:
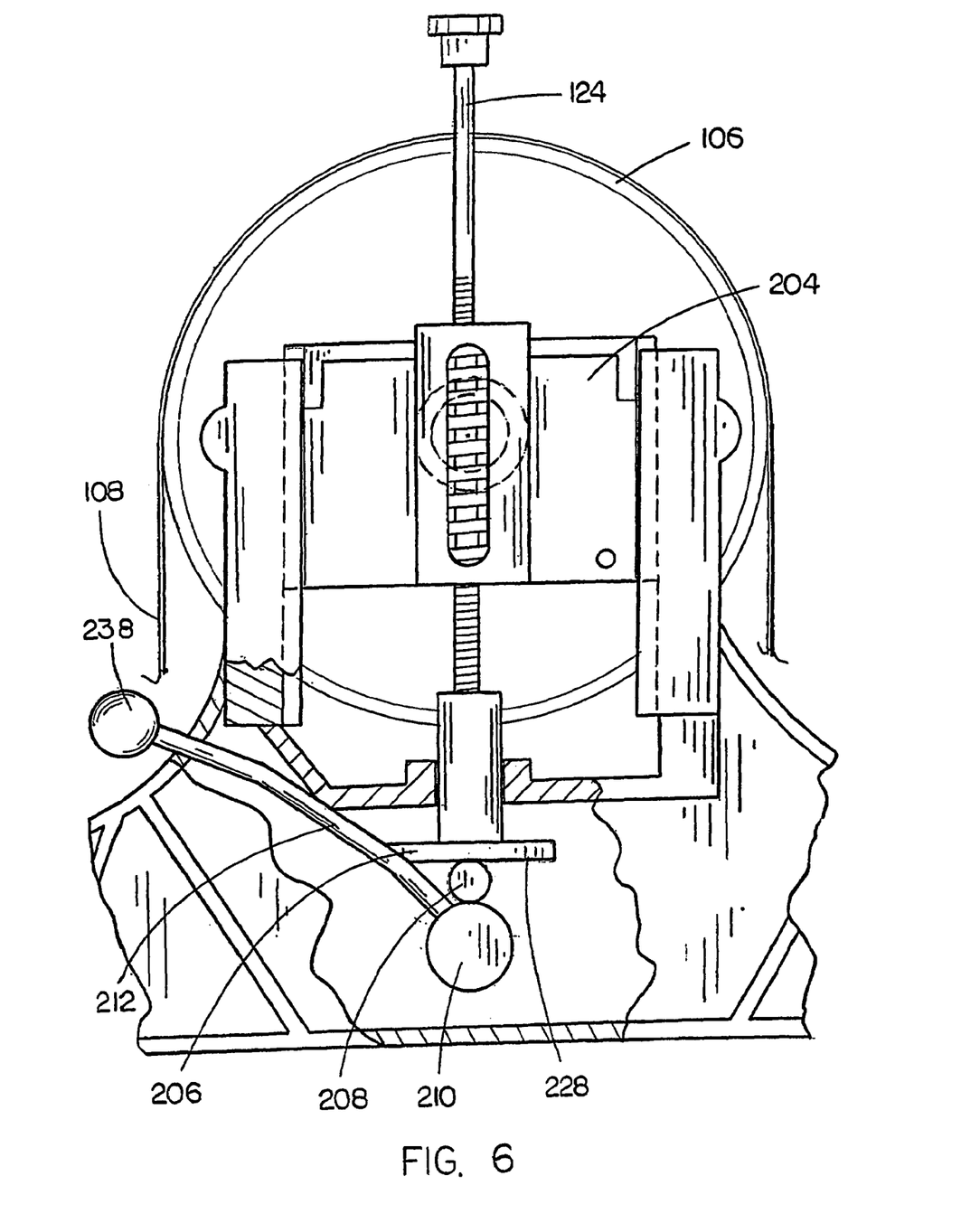
FIG. 6 is a perspective view of the tension crank including the pin, wherein the pin is operationally engaging the lifting shoe in a second position.

The sliding tension bracket 204 is operationally coupled with the upper arm 202 and the upper band wheel 106 (shown in FIGS. 5 and 6). The coupling of the sliding tension bracket 204 with the upper arm 202 enables the sliding tension bracket 204 to move relative to the upper arm 202. The movement of the sliding tension bracket 204 translates into movement of the upper band wheel 106. This movement of the upper band wheel 106 results in either a decrease of the space between the upper band wheel and the lower band wheel or an increase in the space between these two components. When the saw blade is engaged on the band saw, the result of moving the upper band wheel 106 is to decrease or increase the tension on the saw blade.

The sliding tension bracket 204, through operation of the present invention, has a range of motion imparted to it through a lifting shoe 206 which is moveably disposed within the upper arm 202 and operationally coupled with the sliding tension bracket 204. In the current embodiment, the operational coupling of the lifting shoe 206 with the sliding tension bracket 204 is accomplished through the threaded shaft 124. The threaded shaft 124 (shown in FIG. 4) couples with and extends through the sliding tension bracket 204 and couples within a sleeve 224 of the lifting shoe 206. The threaded shaft 124 is a part of a standard blade tensioning assembly whereby rotation of the threaded shaft 124 results in the movement of the sliding tension bracket 204 relative to the upper arm 202. Thus, the standard blade tensioning assembly imparts or releases a tension to the saw blade 108 through engagement by the operator of the band saw 100.

It is contemplated and shown in FIGS. 1 and 4, that the sliding tension bracket 204 may include a graduation assembly comprising a series of graduations and a marker for position indication. The graduation assembly indicates the proper operational tension settings for various widths of blades, to be achieved using the standard blade tensioning assembly. For example, with the blade on the upper and lower band wheels, the threaded shaft 124 is turned, to raise or lower the upper band wheel, until the marker is in line with the proper graduation for the size of blade being used. As will be described in FIGS. 5 and 6, the quick-pin blade tensioning device is used in conjunction with the standard blade tensioning assembly.

In alternate embodiments the lifting shoe may engage directly with the sliding tension bracket 204. It is understood that the quick-pin blade tensioning device of the present invention may be employed with band saws which utilize alternate tensioning systems, such as a rack and pinion system without departing from the scope and spirit of the present invention. The lifting shoe 206, in the current embodiment, is shaped like an upside down "T". Alternatively, the lifting shoe 206 may assume a variety of configurations which allow it to receive the shaft 124 or directly engage with the sliding tension bracket 204 to impart movement. Movement is imparted to the lifting shoe 206 by the pin 208. A first end 226 of the pin 208 engages against a bottom side 228 of the lifting shoe 206. A second end 220 of the pin 208 is coupled with a first end 222 of the tension crank 210. Alternatively, the pin 208 may be integrated into the first end 222 of the tension crank 210.

The first end 226 of the pin 208 is enabled to provide support to the bottom side 228 of the lifting shoe 206 by providing a surface through which contact between the pin 208 and the lifting shoe 206 is maintained. Preferably, the pin 208 is of a configuration which maximizes the amount of contact with the lifting shoe 206 and maintains the ability of the tension crank 210 to properly couple within the upper arm 202. Therefore, as the pin 208 is moved or rotated from one position to another it provides an effective support structure for the lifting shoe 206.

The movement of the pin 208 from one position to another is enabled by its coupling with the tension crank 210. Preferably, the tension crank 210 is of a configuration which allows it to be disposed within the upper arm 202 and still maintain the ability to rotate within. This rotation ability allows the tension crank 210 to rotate the pin 208. A second end 230 of the tension crank 210 includes a first connection assembly 214 which enables the coupling of a first end 232 of the tension handle 212 with the second end 230 of the tension crank 210. The coupling may occur using a variety of mechanisms, such as a fastener assembly, compression lock assembly, and the like. For example, in the present embodiment the first end 232 of the tension handle 212 inserts, at least partially, into the second end 230 of the tension crank 210. A fastener pin 234 is inserted through an insertion point 240 which extends through the tension crank 210. The fastener pin 234 inserts through the tension crank 210 and engages with a second insertion point 242 disposed on the first end 232 of the tension handle 212 to fasten the tension crank 210 and the tension handle 212 together. A ring or other appropriate assembly may be coupled with the fastener pin 234 to prevent the fastener pin 234 from moving out of position during operation and provide an easy way to remove the fastener pin 234. As is contemplated, the tension handle 212 may be removed from the tension crank 210 to prevent operation of the quick release blade tensioning device. It is further contemplated that the tension handle 212 may be integrated with the tension crank 210, not allowing the tension handle 212 to be removed from the tension crank 210.

A second end 236 of the tension handle 212 provides the user of the band saw with an area of engagement. In the current embodiment, the second end 236 is coupled with a ball knob 238. It is understood that the ball knob 238 may be a variety of devices, such as an L-shaped handle or other contoured configurations as contemplated by one of ordinary skill in the art. Further, the composition of the ball knob 238 may vary, utilizing such materials as plastic, metal, wood, composites, and the like. The coupling occurs through a threaded connection between the ball knob 238 and the second end 236 of the tension handle 212. Other fastening assemblies, compression lock assemblies, may be employed without departing from the scope and spirit of the present invention. It is also contemplated that the ball knob 238 may be integrated with the tension handle 212. The location of the ball knob 238 upon the tension handle 212 may also vary to accommodate differing user and/or manufacturer needs. The ball knob 238 may be engaged by the user of the band saw to adjust the position of the tension handle 212.

The present invention provides the tension handle 212 with the ability to be adjusted between a first position, shown in FIG. 5, and a second position, shown in FIG. 6, by the user of the band saw 100. In the first position the tension handle 212 indicates to the user that quick-pin blade tensioning device is not applying a tension to the saw blade 108 through the upper band wheel 106. Thus, the pin 208, while remaining engaged with the lifting shoe 206, is not raising the lifting shoe 206 to increase tension on the saw blade 108. In the second position the tension handle 212 indicates that the quick-pin blade tensioning device is applying a tension to the saw blade 108 through movement of the upper band wheel 106. The quick-pin tensioning assembly is used in conjunction with the standard blade tensioning assembly, as described previously, to establish an operational tension setting. In operation, the establishing of the operational tension setting by the standard blade tensioning assembly is accomplished with the tension handle 212 in the second position whereby the quick-pin blade tensioning device is applying an amount of tension. When the user of the band saw 100 is satisfied with the operational tension setting established by the standard blade tensioning assembly, in combination with the quick-pin blade tensioning assembly engaged in the second position, they may operate the band saw or decide not to operate the band saw. After the user is finished operating the band saw or if they decide not to operate it the user may rotate the tension handle 212 back into the first position, thereby releasing the amount of tension on the saw blade 108 imparted through the quick-pin blade tensioning device but maintaining the position of the standard blade tensioning assembly. Thus, warping of the blade and frame of the band saw may be prevented. Further, re-establishing the operational tension setting of the saw blade 108, should the user decide to use the band saw, may be accomplished simply by rotating the tension handle 212 back into the second position.

Those skilled in the art will understand that the amount of tension provided by the quick-pin blade tensioning device, in the current embodiments, is a pre-set amount. The amount of tension applied and released by the quick-pin blade tensioning device is determined by the range of motion provided to the lifting shoe 206 by the pin 208 coupled to the tension crank 210. Therefore, in the present embodiments, the size of the tension crank 210 determines the amount of tension that may be applied or released through use of the quick-pin blade tensioning device. As such, the diameter of the tension crank 210 may be varied as contemplated by one of ordinary skill in the art, to accommodate a wide range of tensioning options. It is contemplated that the movement imparted to the tension crank 210 by the tension handle 212 may include not only rotational movement but vertical movement of the tension crank 210, as well. The vertical movement providing additional tensioning capabilities to the quick-pin blade tensioning device. For example, the rotation of the tension handle 212 from the first to the second position may rotate the tension crank 210 and cause it to slide up within the upper arm of the band saw. When tension is released the tension handle 212 is rotated back to the first position, which rotates the tension crank 210 and causes it to slide down within the upper arm of the band saw.

Figure 7:
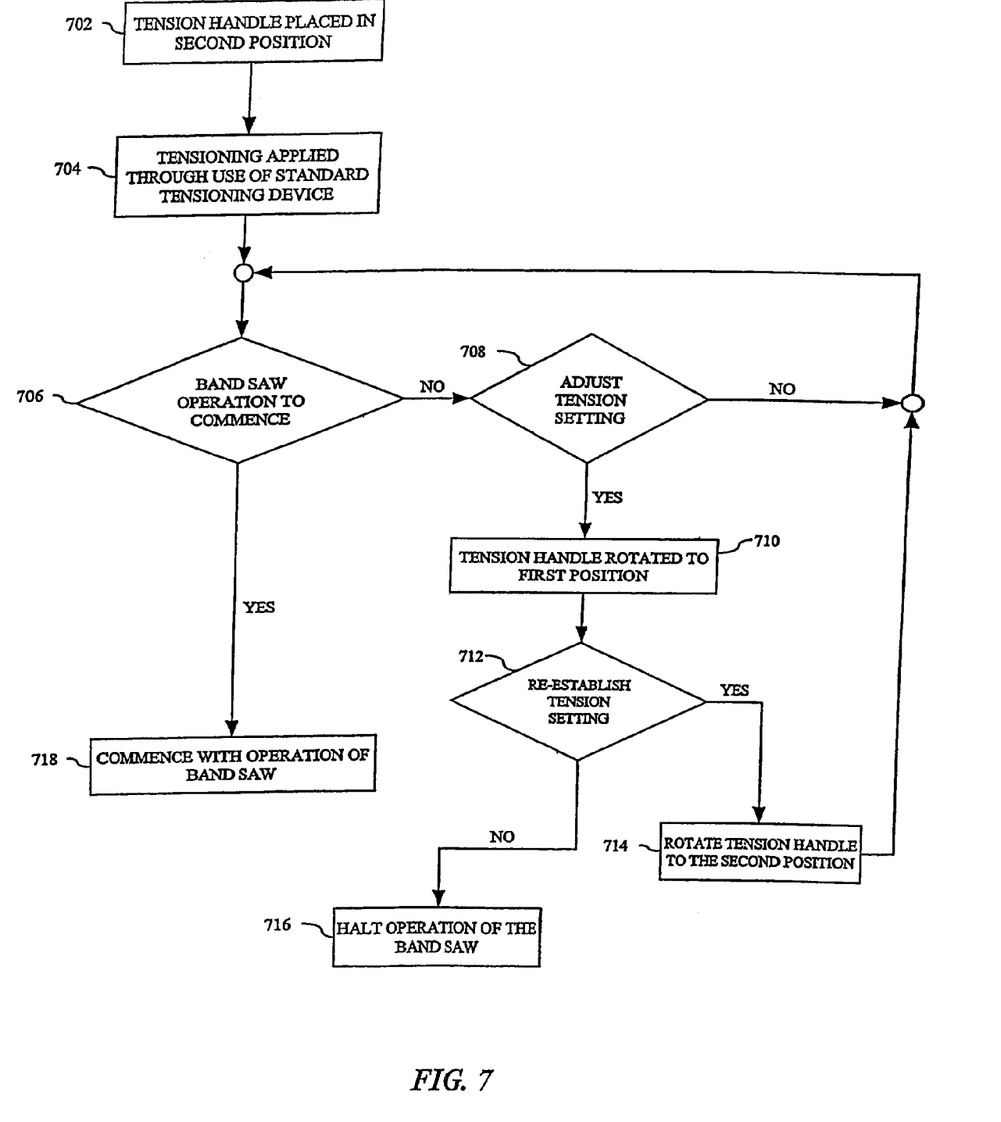
FIG. 7 is a flowchart illustrating a method of using the band saw including the quick-pin blade tensioning device of the present invention.

The method of use, shown in FIG. 7, provides a guideline for the operation of a band saw including the quick-pin blade tensioning device of the present invention. In step 702 the tension handle 212 of the quick-pin blade tensioning device is rotated into the second position. By placing the tension handle 212 in the second position an amount of tension is applied to the saw blade 108. In step 704 the user of the band saw uses a standard blade tensioning device to establish an operation tension setting. This operational tension setting establishes the tension to be placed on the band saw blade during operation of the band saw. After setting the tension, step 706 determines if the user will operate the band saw. If the user decides to operate the band saw, in step 706, then the method proceeds to step 718 where operation of the band saw commences. If the user decides not to operate the band saw, in step 708, the user decides whether to adjust the tension setting. In step 708, the user may decide not to adjust the tension setting of the saw blade and leave the tension handle 212 in the second position. After deciding to not adjust the tension setting, in step 708, the user returns to step 706 and determines if they will operate the band saw. Alternately, the user may decide in step 708 to adjust the tension setting. Then in step 710 the user may rotate the tension handle 212 to the first position, thereby releasing tension from the saw blade. By releasing the tension on the saw blade through use of the present invention the band saw including the saw blade may be protected from warping and damage. In step 712 the user decides whether to re-establish the operational tension setting. If the user decides to re-establish the operation tension setting, then in step 714, the user rotates the tension handle 212 back into the second position and then the user returns to step 706 and determines if they wish to operate the band saw. If the user decides not to re-establish the operation tension setting in step 712 then operation of the band saw is halted in step 716. Halting the operation of the band saw may include adjustment of the standard tensioning device or not.

It is understood that the specific order or hierarchy of steps in the method disclosed is an example of an exemplary approach. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A quick-pin blade tensioning device for a band saw including an upper band wheel mounted via an upper arm, the upper band wheel engaging a band saw blade, comprising:

a sliding tension bracket for engaging the upper band wheel and the upper arm of the band saw;

a lifting shoe having a bottom surface and coupled with the sliding tension bracket, the lifting shoe configured and dimensioned to be received within the upper arm of the band saw and to slide the sliding tension bracket within the upper arm of the band saw;

a pin for contacting the bottom surface of the lifting shoe for moving the lifting shoe within the upper arm of the band saw;

a rotatable tension crank having an axis of rotation, a first end and a second end, the first end coupled with the pin such that the pin rotates with the tension crank, at least a portion of the pin extending axially outwardly from the tension crank, the tension crank configured and dimensioned to be received within the upper arm of the band saw, wherein the pin is spaced from the axis of rotation, and wherein there is no structure adjacent the pin that is both mounted to the tension crank for movement therewith and capable of drivingly contacting the lifting shoe;

a tension handle having a first position and a second position, the tension handle coupled with the second end of the tension crank, wherein the tension handle rotates the tension crank causing the pin to revolve about the axis of rotation of the tension crank when the tension handle is moved, and wherein the tension handle, when moved from the first position to the second position, causes the pin to revolve to a position where the pin contacts and moves the lifting shoe for applying tension to the band saw blade.

2. The quick-pin blade tensioning device of claim 1, wherein the band saw further includes a second blade tensioning device.

3. The quick-pin blade tensioning device of claim 1, wherein the tension handle is removable from the tension crank.

4. The quick-pin blade tensioning device of claim 1, wherein the tension handle has at least three positions.

5. The quick-pin blade tensioning device of claim 1, wherein the tension crank may be replaced with a tension crank having a different size, and wherein the tension applied to the band saw blade when the tension handle is moved changes as the size of the tension crank is changed.

6. A band saw including an upper band wheel engaging a band saw blade, comprising:

a quick-pin blade tensioning device coupled with the upper band wheel of the band saw, the quick-pin blade tensioning device comprising, a sliding tension bracket engaging with an upper arm of the band saw and the upper band wheel;

a lifting shoe having a bottom surface and coupled with the sliding tension bracket, the lifting shoe received within the upper arm of the band saw to slide the sliding tension bracket within the upper arm;

a pin for contacting the bottom surface of the lifting shoe and moving the lifting shoe within the upper arm of the band saw;

a rotatable tension crank having an axis of rotation, a first end and a second end, the first end coupled with the pin such that the pin rotates with the tension crank, at least a portion of the pin extending axially outwardly from the tension crank, the tension crank received within the upper arm, wherein the pin is spaced from the axis of rotation, and wherein there is no structure adjacent the pin that is both mounted to the tension crank for movement therewith and capable of drivingly contacting the lifting shoe;

a tension handle having a first position and a second position, the tension handle coupled with the second end of the tension crank, wherein the tension handle rotates the tension crank causing the pin to revolve about the axis of rotation of the tension crank when the tension handle is moved, and wherein the tension handle, when moved from the first position to the second position, causes the pin to revolve to a position where the pin contacts and moves the lifting shoe applying tension to the band saw blade.

7. The band saw of claim 6, wherein the band saw further includes a second blade tensioning device.

8. The band saw of claim 6, wherein the tension handle is removable from the tension crank.

9. The quick-pin blade tensioning device of claim 6, wherein the tension handle has at least three positions.

10. The quick-pin blade tensioning device of claim 6, wherein the tension crank may be replaced with a tension crank having a different size, and wherein the tension applied to the band saw blade when the tension handle is moved changes as the size of the tension crank is changed.

* * * * *